US008808612B2

(12) United States Patent
Alms et al.

(10) Patent No.: US 8,808,612 B2
(45) Date of Patent: Aug. 19, 2014

(54) COMPUTER CONTROLLED FLOW MANIPULATION FOR VACUUM INFUSION PROCESSES

(75) Inventors: Justin B. Alms, Newark, DE (US);
James L. Glancey, Blackbird, DE (US);
Suresh G. Advani, Newark, DE (US)

(73) Assignee: University of Delaware, Newark, DE (US)

( * ) Notice: Subject to any disclaimer, the term of this patent is extended or adjusted under 35 U.S.C. 154(b) by 860 days.

(21) Appl. No.: 12/858,948

(22) Filed: Aug. 18, 2010

(65) Prior Publication Data

US 2011/0046771 A1 Feb. 24, 2011

Related U.S. Application Data

(60) Provisional application No. 61/234,894, filed on Aug. 18, 2009.

(51) Int. Cl.
*B29C 70/44* (2006.01)

(52) U.S. Cl.
USPC ............................ 264/571; 264/258; 156/382

(58) Field of Classification Search
USPC .................................. 264/571, 258; 156/382
See application file for complete search history.

(56) References Cited

U.S. PATENT DOCUMENTS

| | | |
|---|---|---|
| 3,339,239 A | 9/1967 | Peck |
| 4,622,091 A | 11/1986 | Letterman |
| 4,902,215 A | 2/1990 | Seemann, III |
| 5,007,814 A | 4/1991 | Saunders et al. |
| 5,052,906 A | 10/1991 | Seemann |
| 5,316,462 A | 5/1994 | Seemann |
| 5,443,778 A | 8/1995 | Schlingman |
| 5,772,950 A | 6/1998 | Brustad |
| 5,885,495 A | 3/1999 | Ibar |
| 5,902,535 A | 5/1999 | Burgess |
| 6,298,896 B1 | 10/2001 | Sherrill |
| 6,299,819 B1 | 10/2001 | Han |
| 6,406,659 B1 | 6/2002 | Lang et al. |
| 6,406,660 B1 | 6/2002 | Spurgeon |
| 6,506,325 B1 | 1/2003 | Cartwright |
| 6,555,045 B2 | 4/2003 | Mcclure |
| 7,334,782 B2 | 2/2008 | Woods et al. |

(Continued)

FOREIGN PATENT DOCUMENTS

| | | |
|---|---|---|
| EP | 0045555 | 8/1981 |
| WO | 2004101259 | 11/2004 |
| WO | 2007040797 A2 | 4/2007 |
| WO | 2007054101 | 5/2007 |

OTHER PUBLICATIONS

International Search Report dated Mar. 20, 2012, application No. PCT/US2011/049095.

(Continued)

*Primary Examiner* — Galen Hauth
(74) *Attorney, Agent, or Firm* — RatnerPrestia

(57) ABSTRACT

Methods and apparatus for vacuum infusing resin into a fabric preform within a mold. The methods comprise increasing permeability in a selected region, such as by deploying a VIPR chamber in a location corresponding to the resin injection port corresponding to the resin flow front furthest from the mold vent or a location identified by predictive modeling as best to achieve a desired flow front geometry. Suitable apparatus comprise a VIPR chamber, an image detector for detecting resin flow fronts, a processor programmed to identify a desired location to deploy the VIPR chamber, and an automatic positioner for moving the VIPR chamber to the identified location.

13 Claims, 13 Drawing Sheets

(56) References Cited

U.S. PATENT DOCUMENTS

| | | | |
|---|---|---|---|
| 7,517,481 | B2 | 4/2009 | Advani |
| 7,762,122 | B2 | 7/2010 | Advani |
| 2002/0022422 | A1 | 2/2002 | Waldrop |
| 2002/0081147 | A1 | 6/2002 | Gianaris |
| 2002/0155186 | A1 | 10/2002 | Walsh |
| 2003/0025232 | A1 | 2/2003 | Slaughter et al. |
| 2003/0111773 | A1 | 6/2003 | Janusson |
| 2003/0211194 | A1 | 11/2003 | Louderback |
| 2004/0049324 | A1 | 3/2004 | Walker |
| 2004/0109909 | A1 | 6/2004 | Dubay |
| 2005/0042961 | A1 | 2/2005 | Lehmann |
| 2005/0053765 | A1 | 3/2005 | Albers |
| 2005/0253309 | A1 | 11/2005 | Hou |
| 2006/0255500 | A1 | 11/2006 | Advani |
| 2007/0063393 | A1 | 3/2007 | Vernin |
| 2007/0132142 | A1 | 6/2007 | Voegeli |
| 2007/0158874 | A1 | 7/2007 | Van Herpt |
| 2008/0136060 | A1 | 6/2008 | Shpik et al. |
| 2009/0273107 | A1 | 11/2009 | Advani |
| 2010/0072677 | A1 | 3/2010 | Alms |
| 2011/0006460 | A1 | 1/2011 | Vander Wel et al. |

OTHER PUBLICATIONS

Advani, Suresh G.; Sozer, E. Murat; Process Modeling in Composites Manufacturing; 2003, Marcel Dekker, Inc.; pp. 1-55, 151-223; ISBN 0-8247-0860-1.

Allende, Melquiades, et al., "Characterization and Analysis of Flow Behavior in the FASTRAC Process for the Manufacture of Sandwich and Core Composite Structures," International SAMPE Symposium and Exhibition, May 11-15, 2003, 0891-0138(48):303-311.

Allende, Melquiades., et al., "Experimental and Numerical Analysis of Flow Behavior in the FASTRAC Liquid Composite Manufacturing Process," Polymer Composites, Aug. 2004, vol. 25, No. 4, 384-396.

Alms, Justin, et al., "Simulation and experimental validation of flow flooding chamber method of resin delivery in liquid composite molding," Composites: Part A, 38 (2007), 2131-2141.

Bickerton, S. et al., "Experimental Analysis and Numerical Modeling of Flow Channel Effects in Resin Transfer Molding," Polymer Composites, Feb. 2000, vol. 21, No. 1, 134-153.

Bickerton, Simon, et al., "Design and application of actively controlled injection schemes for resin-transfer molding," Composites Science and Technology, vol. 61, (2001), 1625-1637.

Bruschke, M. V. et al., "A Finite Element/Control Volume Approach to Mold Filling in Anisotropic Porous Media," Polymer Composites, Dec. 1990, vol. 11, No. 6, 398-405.

Correia, N. C. et al., "Use of Resin Transfer Molding Simulation to Predict Flow, Saturation, and Compaction in the VARTM Process," Journal of Fluids Engineering, Mar. 2004, vol. 126, 210-215.

Dai, J. et al., "A Comparative Study of Vacuum-Assisted Resin Transfer Molding (VARTM) for Sandwich Panels," Polymer Composites, Dec. 2003, vol. 24, No. 6, 672-685.

Devillard, Mathieu et al., "On-line Characterization of Bulk Permeability and Race-tracking During the Filling Stage in Resin Transfer Molding Process," Journal of Composite Materials, vol. 37, No. 17/2003, 1525-1541.

Gokce, Ali et al., "Permeability estimation algorithm to simultaneously characterize the distribution media and the fabric preform in vacuum assisted resin transfer molding process," Composites Science and Technology, 65 (2005), 2129-2139.

Hammami, Adel, "Key Factors Affecting Permeability Measurement in the Vacuum Infusion Molding Process," Polymer Composites, Dec. 2002, vol. 23, No. 6, 1057-1067.

Hsiao, Kuang-Ting et al., "Simulation based flow distribution network optimization for vacuum assisted resin transfer moulding process," Modelling Simul. Mater. Sci. Eng., 12 (2004), S175-S190.

International Search Report issued in PCT/US2010/045850 filed on Aug. 18, 2010, mailed Jun. 23, 2011.

Kasprzak, Scott et al., "A Robotic System for Real-time Resin Flow Modification During Vacuum-Assisted Resin Transfer Molding," ASME International Mechanical Engineering Congress and Exposition, Nov. 5-10, 2006, 1-9.

Lawrence, Jeffrey et al., "Automated manufacturing environment to address bulk permeability variations and race tracking in resin transfer molding by redirecting flow with auxiliary gates," Composites: Part A, 36 (2005), 1128-1141.

Lawrence, Jeffrey et al., "Experimental Study to Illustrate Flow Control in Presence of Race Tracking Disturbances in. Resin Transfer Moulding," Advanced Composites Letter, vol. 12, No. 3, (2003), 103-112.

Markicevic, B. et al.,"Role of Flow Enhancement Network during Filling of Fibrous Porous Media," Journal of Porous Media, 2005, vol. 8, No. 3, 281-297.

Rigas, Elias J. et al., "Development of a Novel Processing Technique for Vacuum Assisted Resin Transfer Molding (VARTM)," 46th International SAMPE Symposium and Exhibition, Long Beach, CA, May 6, 2001, 1086-1094.

Simacek, Pavel et al., "Modeling resin flow and fiber tow saturation induced by distribution media collapse in VARTM," Composites Science and Technology, 67 (2007), 2757-2769.

Walsh, Shawn M. et al., "Minimizing Cycle Time and Part Mark-off in the FASTRAC Process," 33rd International SAMPE Technical Conference, Nov. 5-8, 2001, 1398-1407.

Written Opinion issued in PCT/US2010/045850 filed on Aug. 18, 2010, mailed Jun. 23, 2011.

Wu, Tom J. et al., "The Bearing Strength of E-Glass/Vinyl-Ester Composites Fabricated by VARTM," Composites Science and Technology; 1998, vol. 58, 519-1529.

Alms, et al., "Flow Modification Process for Vacuum Infusion Using Port-Based Resin Flow Control," SAMPE Journal, 45(2):54-63 (Mar./Apr. 2009).

Alms, et al., "In-plane permeability characterization of the vacuum infusion processes with fiber relaxation," Int. J. Mater Form, 9 pages, (Mar. 20, 2010).

Alms, et al., "Mechanical properties of composite structures fabricated with the vacuum induced preform relaxation process," Composite Structures, 92:2811-2816 (2010).

Alms, et al., "Liquid Composite Molding Control Methodologies using Vacuum Induced Preform Relaxation," Composites: Part A, 42:57-65 (2011).

Fuqua, et al., "A Port Injection Process for Improved Resin Delivery and Flow Control in Vacuum-Assisted Resin Transfer Molding," ASME International Mechanical Engineering Congress & Exposition, 1-13, Nov. 5-11 (2006).

Hsiao, et al., "A Closed Form Solution for Flow During the Vacuum Assisted Resin Transfer Molding Process," Journal of Manufacturing Science and Engineering, vol. 122, 463-475 (Aug. 2000).

Johnson, et al., "Enhancement of flow in VARTM using localized induction heating," Composites Science and Technology, 63:2201-2215 (2003).

Johnson, et al., "Flow control using localized induction heating in a VARTM process," Composites Science and Technology, 67:669-684 (2007).

Johnson, et al., "Simulation of active flow control based on localized preform heating in a VARTM process," Composites: Part A, 37:1815-1830 (2006).

Johnson, et al., "Active Control of Reactive Resin Flow in a Vacuum Assisted Resin Transfer Molding (VARTM) Process," Journal of Composite Materials, 42(Dec. 2008):1205-1229 (2008).

Lawrence, et al., "An approach to couple mold design and on-line control to manufacture complex composite parts by resin transfer molding," Composites: Part A, 33:981-990 (2002).

Lawrence, et al., "Design and Testing of a New Injection Approach for Liquid Composite Molding," Journal of Reinforced Plastics and Composites, 23(15/2004):1625-1638 (2004).

Lawrence, et al., "Use of Sensors and Actuators to Address Flow Disturbances During the Resin Transfer Molding Process," Polymer Composites, 24(2):237-248 (Apr. 2003).

Lawrence, et al., "Dependence Map-Based Flow Control to Reduce Void Content in Liquid Composite Molding," Materials and Manufacturing Processes, 20:933-960 (2005).

(56) References Cited

OTHER PUBLICATIONS

Lawrence, et al., "Automated manufacturing environment to address bulk permeability variations and race tracking in resin transfer molding by redirecting flow with auxiliary gates," *Composites: Part A*, 36:1128-1141 (2005).

Lindgren, et al., "Styrene Emissions from the Spray-Up and Vacuum Injection Processes—A Quantitative Comparison," *AIHA Journal*, 63:184-189 (2002).

Marsh, George, "Putting Scrimp in context," *Reinforced Plastics*, 22-26 (Jan. 1997).

Modi, et al., "Active control of the vacuum infusion process," *Composites: Part A*, 38:1271-1287 (2007).

Nalla, et al., "A multi-segment injection line and real-time adaptive, model-based controller for vacuum assisted resin transfer molding," *Composites: Part A*, 38:1058-1069 (2007).

Šimáček, et al., "Desirable Features in Mold Filling Simulations for Liquid Composite Molding Processes," *Polymer Composites*, 25(4):355-367 (Aug. 2004).

COMPUTER CONTROLLED FLOW MANIPULATION FOR VACUUM INFUSION PROCESSES

CROSS REFERENCE TO RELATED APPLICATIONS

This application claims priority to U.S. Provisional Application Ser. No. 61/234,894, filed Aug. 18, 2009, which is incorporated herein, in its entirety, by reference.

STATEMENT REGARDING FEDERALLY SPONSORED RESEARCH

Research was sponsored by the Army Research Laboratory and was accomplished under Cooperative Agreement Number W911NF-06-2-011. The U.S. Government may have certain rights in this invention.

BACKGROUND OF THE INVENTION

Liquid Composite Molding (LCM) is a category of composite manufacturing processes which can create strong lightweight composite materials from various types of fibers and thermosetting resins. Such closed mold processes are becoming more viable because of increasing regulations involved with the use of resin systems containing Volatile Organic Compounds (VOCs) such as styrene. Using closed mold processes reduces the amount of VOCs released into the atmosphere during the manufacturing process. Exemplary LCM processes include the Resin Transfer Molding (RTM) process. RTM technology is best characterized by the use of a rigid two sided matched mold in which the dry preforms are placed. Resin is then injected at constant pressure or constant flow rate until it reaches a desired vent. The resin is then allowed to cure before demolding the part. The tooling cost for this process increases exponentially with the increase in the size of the part to be manufactured.

One exemplary LCM process is known as Vacuum Assisted Resin Transfer Molding (VARTM). The VARTM process reduces tooling costs by using only a single, lightly-constructed mold in which the second molding surface is replaced with a polymer film adhered to the molding surface with a sealant tape. A vacuum pump is used to evacuate the air from the mold and compact the preform fabric. Once the mold is leak-checked, a tube connected to a resin bucket is opened to draw the resin into the mold which flows through the preform toward the vent. Once the resin reaches the vent, the injection is discontinued but the vacuum is maintained until the resin cures. Although the VARTM process may reduce capital investment, it is labor intensive and is more prone to variability in part quality due to human error, which has limited its use. A second limitation with VARTM processes arises from inherent permeability variations within the preform, which often leads to resin filling patterns that leave dry, unfilled regions within the mold. To address this deficiency, recent research into the process has provided an improved understanding and subsequently a greater potential to enhance the consistency of the manufactured parts. Accordingly, there is a need in the art for computer controlled automation to increase the reliability and repeatability of VARTM processes.

SUMMARY OF THE INVENTION

The various aspects of the invention generally comprises methods and apparatus for vacuum infusing resin into a fabric preform within a mold, the mold comprising a tool surface, a plurality of resin injection ports, at least one vent, and a flexible film covering the preform and sealed to the tool surface.

One claimed method comprises the steps of injecting resin through the plurality of resin injection ports; detecting a plurality of resin flow fronts emanating from the resin injection ports; determining a distance between each resin flow front and the at least one vent; identifying the resin flow front that is furthest from the vent; and deploying a VIPR chamber in a sealed relationship with the flexible film in a location corresponding to the flow front furthest from the vent and introducing vacuum into the VIPR chamber.

The above steps of detecting the resin flow fronts, determining distance from the vent, identifying the front furthest from the vent, and deploying the VIPR chamber may be periodically repeated, in which case the VIPR chamber may be moved from a first location corresponding to a first flow front dictated by one performance of the above steps to a second location corresponding to a second flow front dictated by a later performance of these steps.

Another claimed method comprises the steps of injecting resin through the plurality of resin injection ports; detecting a plurality of resin flow fronts emanating from the resin injection ports; determining a distance between each resin flow front and the at least one vent; and using a processor programmed with a predictive model to evaluate the impact of sealing a VIPR chamber over the flexible film in each of a plurality of locations. The best location for deploying the VIPR chamber is identified based on results of the evaluation, the VIPR chamber is deployed in the identified best location, and a vacuum is induced in the VIPR chamber.

In both of the methods described above, the step of detecting the plurality of resin flow fronts may comprise creating an image of the plurality of flow fronts relative to the injection ports and the at least one vent using an image detector connected to a computer processor.

One claimed apparatus comprises a VIPR chamber adapted to be sealingly coupled to the flexible film; an image detector mounted above the mold for identifying a plurality of resin flow fronts emanating from the resin injection ports relative to the at least one vent; a processor connected to the image detector; and an automatic positioner attached to the VIPR chamber for receiving instructions from the processor and moving the VIPR chamber to the location identified by the processor. The processor is programmed to determine a distance between each resin flow front and the at least one vent, identify the resin flow front furthest from the vent, and instruct placement of the VIPR chamber in an identified location where increased permeability is desired. In one embodiment, the processor comprises instructions for identifying the location for placement of the VIPR chamber based upon which resin flow front is furthest from the vent. In another embodiment, the processor is programmed with a predictive model and instructions to run the predictive model to evaluate the impact of placing the VIPR chamber in each of a plurality of locations and to identify the location for placement of the VIPR chamber based upon results of the predictive model evaluation.

In one embodiment, the positioner comprises a gantry system comprising one or more actuators for moving the VIPR chamber along a set of linear or planar coordinates corresponding to planar coordinates of the tool surface; and a piston operable in a direction perpendicular to the tool surface for moving the VIPR chamber in and out of a sealingly coupled relationship with the flexible film.

In one embodiment, the mold further comprises a top plate comprising the plurality of resin injection ports and the at least one vent; a bottom plate spaced from the top plate and having a plurality of piston apertures aligned with the resin injection ports in the top plate; and a membrane disposed over the bottom plate. At least one resin channel is defined between the top plate and the membrane in fluid communication with one or more of the plurality of resin inlets, and at least one vacuum channel is defined between the top plate and the membrane in fluid communication with the at least one vent outlet. The apparatus further comprises a piston vacuum chamber sealed to the bottom plate and a plurality of pistons mounted below the bottom plate within the piston vacuum chamber, each piston aligned with one of the piston apertures in the bottom plate. Each piston is extendable between a closed port position in which the piston urges the membrane into a position blocking the corresponding injection port or vent and an open port position that permits resin flow from the resin channel into the injection port or communication of vacuum between the vent and the vacuum channel. A vacuum regulator attached to the piston vacuum chamber is operable to equalize pressure on opposite sides of the membrane when the mold is under vacuum.

Still another embodiment of the invention comprises a method for vacuum infusing resin into a preform within a mold comprising the steps of injecting resin through the plurality of resin injection ports; detecting a plurality of resin flow fronts emanating from the resin injection ports; identifying a region of the mold in need of increased resin permeability; and locally increasing resin permeability in the identified region. The detecting step may comprise using an image capture device and the step of locally increasing resin permeability may comprise moving a VIPR chamber to the identified region, sealing the VIPR chamber to the flexible film in the identified region, and introducing vacuum into the VIPR chamber. In one embodiment, the identifying step comprises determining a distance between each resin flow front and the at least one vent; identifying the resin flow front that is furthest from the vent, and selecting the identified region to include a region overlying the resin injection port corresponding to the resin flow front furthest from the vent. In another embodiment, the identifying step comprises using a processor programmed with a predictive model to evaluate the impact of increasing permeability in each of a plurality of locations, and selecting the identified region based on results of the evaluation.

BRIEF DESCRIPTION OF THE DRAWINGS

The foregoing summary, as well as the following detailed description of exemplary embodiments of the invention, will be better understood when read in conjunction with the appended drawings, which are incorporated herein and constitute part of this specification. For the purposes of illustrating the invention, there are shown in the drawings exemplary embodiments of the present invention. It should be understood, however, that the invention is not limited to the precise arrangements and instrumentalities shown. In the drawings, the same reference numerals are employed for designating the same elements throughout the several figures. In the drawings.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

Developments in automating in the VARTM process have ranged from cutting the fabric to demolding of the finished parts. One of the most crucial parts of the VARTM process is the filling process. If the resin infusion process does not occur as planned, the part is usually scrapped. Therefore, research has strongly focused on this aspect of the process. Various methods of controlling the resin infusion process have been proposed and studied, such as automated heat induction, port injection, and sequential injection.

One exemplary VARTM process, referred to as a Vacuum Induced Preform Relaxation (VIPR), uses a secondary vacuum chamber to create a seal on the flexible film (outer bag) surface of a vacuum infusion process mold. This extra vacuum chamber may be relatively small compared to the total size of the mold and can be placed directly over an injection port drilled into the tooling surface. When a regulated vacuum source in the range of 0-0.2 bar is applied to the chamber, the affected region of fabric relaxes and becomes more permeable. Such a VIPR process is described in U.S. patent application Ser. No. 11/458,122, incorporated herein in its entirety by reference.

Figure 1:
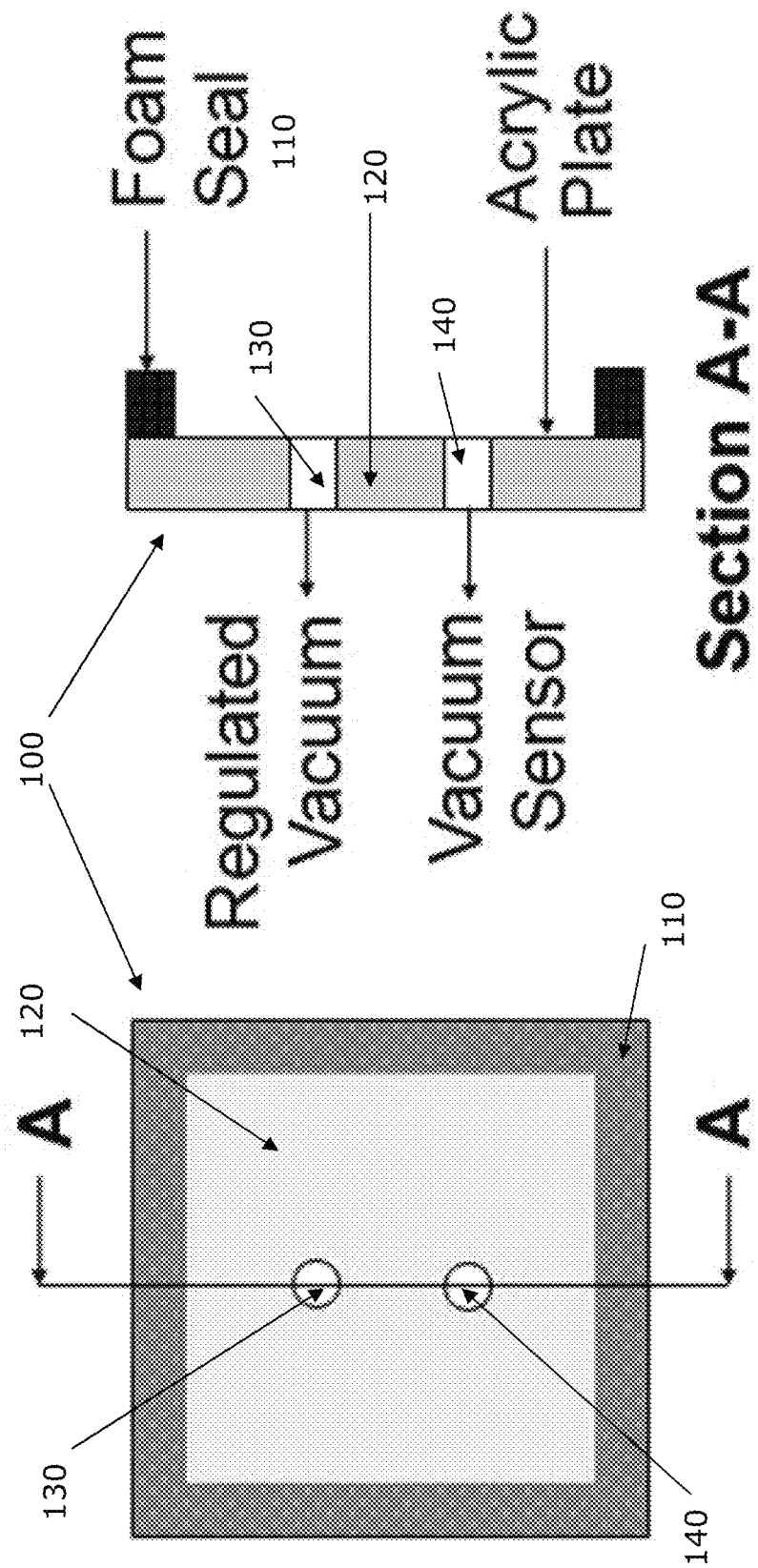
FIG. 1A is a top-view illustration of an exemplary Vacuum Induced Preform Relaxation (VIPR) chamber.
FIG. 1B is a cross-sectional view of the VIPR chamber of FIG. 1A along line A-A.
Figure 2:
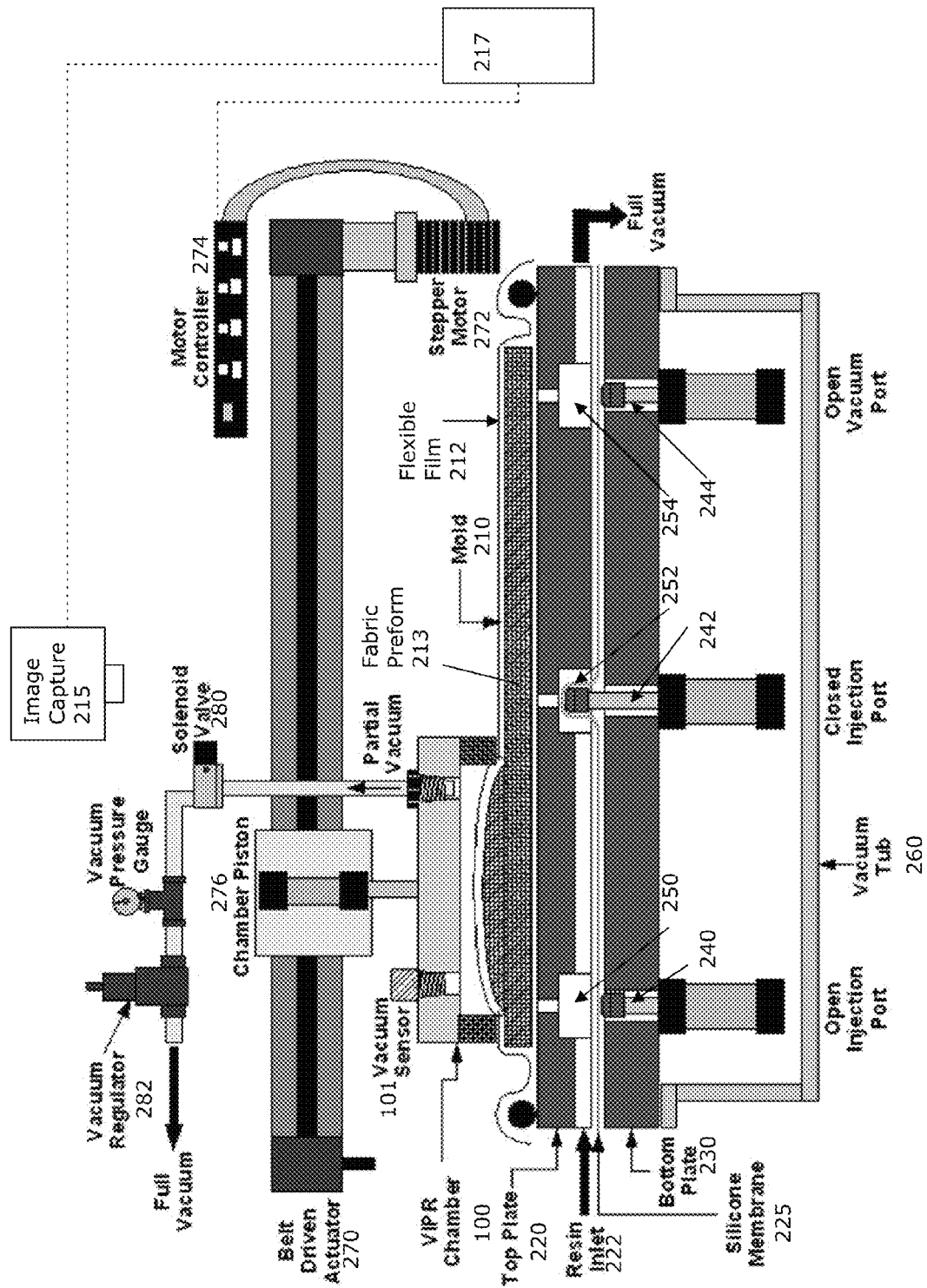
FIG. 2 is a cross-sectional view of an exemplary VIPR process workstation.

An exemplary VIPR chamber 100, is shown in FIG. 1. The vacuum chamber is constructed of a flat plate 120 of a rigid material, such as but not limited to acrylic or aluminum, and a seal, such as for example, a closed foam rubber 110. Two holes 130, 140 in plate 120 permit connection to a regulated vacuum source (not shown) and to a vacuum pressure sensor (not shown). The seal material, such as but not limited to foam rubber, outlines and is adhered to plate 120, forming a chamber that can be placed under vacuum when the seal is placed in a sealing relationship with the bag surface of a mold. VIPR chamber 100 may then be placed onto the mold, as shown in FIG. 2, so that seal material 110 forms an airtight seal against the surface of the flexible film 212. Once the vacuum source is applied, the vacuum causes the fabric under the chamber to become less compact and thus more permeable. When VIPR chamber 100 is placed over an injection port, the chamber 100 affects the flow of resin entering the mold.

The vacuum pressure applied to the chamber is typically within the range of 0-20 kPa vacuum gauge pressure, but is not limited to any particular range of pressures. An ideal vacuum level is one that reduces fiber compaction pressure sufficient to improve permeability without separating the bag from the preform underneath. Depending on the physical arrangement of the mold and the inlet gate vacuum pressures, exceeding 20 kPa may cause the flexible molding surface to pull away from the fiber preform.

During an LCM infusion, unpredictable permeability variations cause the resin flow front to progress in an unrepeatable and sometimes undesirable manner. If the flow progression deviates far from the intended flow pattern, large defects in the infused composite structure may result. Using the VIPR chamber during an infusion to change the path of least resistance within the mold can incrementally change the developing flow pattern and ensure these areas will be saturated with resin before the void regions become unrepairable. Using an automated VIPR process offers seamless implementation of when and where to employ the chamber. Described herein are two exemplary flow control methodologies for controlling when and where to invoke use of the VIPR chamber to accelerate resin flow in a region of interest. The invention is not limited to any particular methodology, however.

FIG. 2 shows a cross-sectional illustration of an exemplary VIPR workstation 200. Certain elements of the exemplary workstation are explained in more detail in U.S. Pat. No. 7,517,481 to Advani et al., incorporated herein by reference. Workstation 200 shown in FIG. 2 includes a VIPR chamber 100 and is configured to control various aspects of the infusion process. The workstation has the ability to spatially control the injection of resin by deploying the VIPR chamber in a way that changes the resin flow patterns. Workstation 200 contains a mold 210, comprising a top plate 220 and a bottom plate 230. A fabric preform 213 sits on the upper surface of top plate 220, also referred to herein as the "tool surface" of the mold. A vacuum bag 212, also referred to herein as a "flexible film," covers the preform and is sealingly coupled to the mold as is well known in the art. Membrane 225, such as but not limited to a silicone membrane, separates the top plate 220 and the bottom plate 230. Top plate 220 includes one or more features that define at least one resin channel 222 between the membrane and the top plate. Resin channel 222 is connected to resin inlet ports 250, 252. Three pneumatic pistons 240, 242, 244 are mounted to bottom plate 230. Two of these pistons 240, 242 are aligned with resin inlet ports 250, 252 and control the injection of resin into the mold. In the open port configuration shown in FIG. 2, piston 240 is compressed, leaving sufficient space between membrane 225 and resin inlet port 250 to permit resin flow. Piston 242 in FIG. 2 is depicted in a closed port configuration in which the piston is extended such that the membrane 225 blocks resin from entering inlet port 250.

The third piston 244 is used to vent the gas from the mold through a vacuum channel defined between the top plate and the membrane. Piston 254, shown in FIG. 2 in the open position, controls vacuum port 254 in a manner similar to how pistons 240 and 242 control resin flow. Piston vacuum chamber 260, also referred to as "vacuum tub" in FIG. 2, is sealed to bottom plate 230 and encases the three pneumatic pistons 240, 242 and 244. Vacuum tub 260 allows the pistons to open and close the ports when the mold is under vacuum pressure. Pressure in vacuum tub 260 is controlled to equalize pressure on both sides of membrane 225 when mold 210 is under vacuum.

The VIPR process is implemented into this workstation by controlling the location of VIPR Chamber 100. A gantry system consisting of linear actuators 270, stepper motors 272, a motor controller 274, and a pneumatic piston 276 control the position of the VIPR Chamber 100. As shown in FIG. 2, the linear actuator consists of belt driven actuator 270. In one embodiment, the resin inlet vents may be located such that a single linear actuator and related motors and controls may provide a range of motion along a single line that may be adequate to move the VIPR chamber to achieve desired results, whereas in other embodiments the resin inlet vents may be located such that a full range of motion to cover a planar area dictates having a plurality of linear actuators or other two-dimensional actuator system and related motors and controls to place the VIPR chamber 100 in desired locations along the length or the width of the mold 210. In the embodiment shown in FIG. 2, linear actuator 270 controls planar motion of the VIPR chamber 100 along the coordinate plane of the mold and piston 276 controls the direction of the chamber perpendicular to that coordinate system to firmly press the VIPR Chamber 100 against the mold 210 surface and to release the chamber from the mold surface. The regulated vacuum pressure applied to the VIPR Chamber 100 is controlled by a coupled system comprising solenoid valve 280 and vacuum pressure regulator 282. Solenoid valve 280 allows the VIPR Chamber 100 to be under a regulated pressure/vacuum or atmospheric pressure, as required by the specific molding situation. An image capture device 215, such as but not limited to a charge coupled device (CCD), a digital camera, or any other machine vision system known in the art, is mounted to a frame (not shown) above the mold to monitor resin flow front progression and is used for control of the VIPR chamber motion. Use of an image capture device in conjunction with a VARTM process is generally described in U.S. Pat. No. 7,762,122, incorporated herein in its entirety by reference. Analysis of photographs taken with the image capture device provides feedback for making appropriate control actions.

All of the aforementioned subsystems are typically connected to a single computer processor 217 with control integrated using a computer program, such as a program written using LABVIEW® software (National Instruments, Austin, Tex.) or other similar software known in the art. The invention is not limited to any particular type of computer software or integrated hardware. Suitable computer hardware and associated software may be referred to herein as a "processor" without limitation to any particular configuration. Although shown connected only to image capture device 215 and motor controller 274 for actuator 270 in FIG. 2 to reduce clutter in the figures, processor 217 is typically also connected to at least chamber piston 276, injection port pistons 240, 242, and 244, and may also be connected to solenoid valve 280, vacuum regulator 282, and vacuum sensor 101 on VIPR chamber 100, as well as to any other instruments and controllers not shown in the figures used for monitoring and controlling the VARTM process.

Although described herein in connection with an embodiment featuring a CCD, digital camera, or machine vision system as the image capture device, it should be understood that the terms "camera" and image capture device are not limited to traditional cameras or image capture devices operable within the visible light spectrum. Image capture devices using any portion of the radiation spectrum may be used in connection with the described process, including but not limited to devices using infrared wavelengths, near-infrared wavelengths, and T-ray wavelengths.

Closed Loop Control

Figure 3:
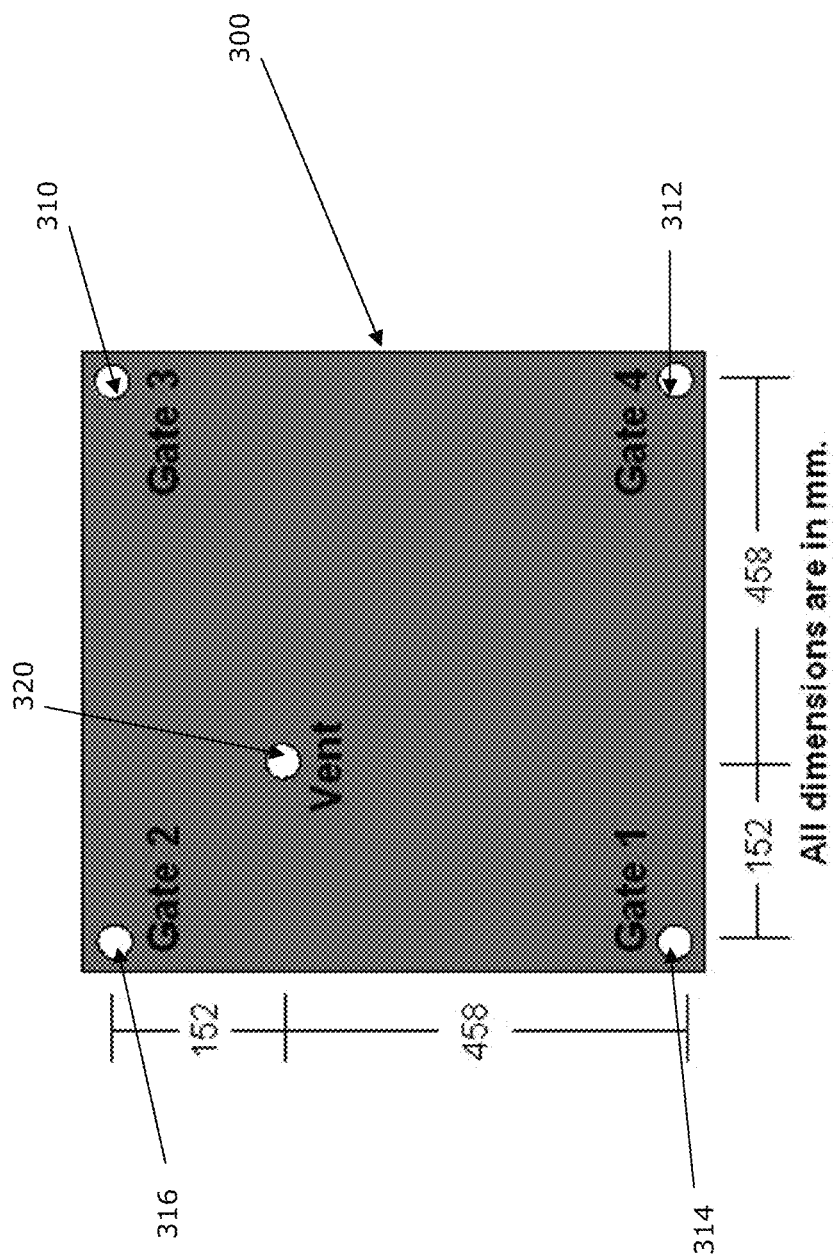
FIG. 3 is a top-view illustration of an exemplary four corner port injection mold surface showing the location of the injection ports and an off-center vent.

A closed loop control strategy for automated resin steering towards a mold vent using a VIPR chamber controlled by feedback from an image capture device may be adopted for any pre-defined arrangement of injection ports, such as, for example, the exemplary four corner injection mold depicted in FIG. 3. Square mold 300 consists of four gates (also referred to herein as "resin injection ports") 310, 312, 314, 316 and an off center vent 320. Vent 320 is located off-center to demonstrate the capability of the workstation to steer resin flow to assure complete filling in non-symmetric situations. During the resin infusion process, all four gates 310, 312, 314, 316 and vent 320 are kept open until the resin reaches vent 320. Once the resin reaches vent 320, injection is discontinued. The resin flow pattern may be manipulated by positioning and actuation of the VIPR chamber at selected times during the infusion process to ensure that the resin arrives at the vent with only minimal unsaturated preform remaining. The VIPR chamber motion is controlled by an algorithm used to move the chamber from one gate to the next based upon feedback from the image capture device to quantify the resin flow front location.

Figure 4:
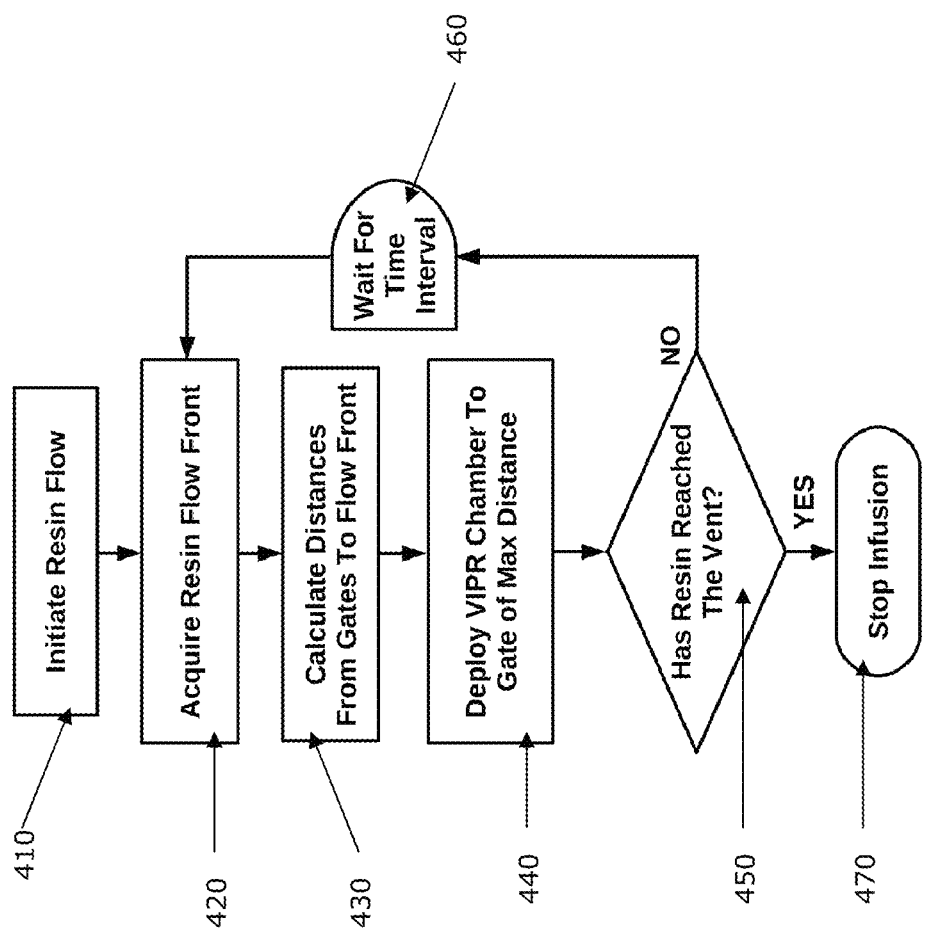
FIG. 4 is a flow chart depicting an exemplary closed loop method for controlling vacuum in a four corner port injection mold.

In this example, online control is achieved through the use of a simple algorithm based on the distance between the vent location and the leading edge of the resin flow front. An exemplary online control technique implemented for this work is depicted in a flow chart in FIG. 4. The resin flow is initiated at step 410. Image capture device mounted above the mold and connected to the control computer monitors resin flow front progress. A single image of the mold is taken and image processing software on the computer, such as but not limited to image processing software integrated into LAB-VIEW® software, or any image processing software known in the art or specifically designed for this purpose, analyzes the image and determines the resin flow front at step 420. The invention is not limited to any particular type of image processing software. The processing software then calculates the distance between the vent and the flow front in the direction of each gate at step 430. At step 440, the VIPR chamber is then deployed to the gate identified as having a resin progression furthest from the vent. In one embodiment, the VIPR chamber may be deployed at one of the four locations identified in FIG. 6. Placing the VIPR chamber over a specific gate increases resin flow at that gate relative to the other gates, thus advancing the flow front from that gate faster towards the vent. After each deployment of the chamber, the controller will wait a pre-specified amount of time at step 460, before reassessing the need to take further control action. Finally, at step 470, the infusion is stopped and all four gates are closed once the resin flow front reaches the vent. The size of the chamber and the time interval between successive deployments can be scaled with the size of the part. While ideally controlled by computer analysis, the analysis of where to deploy the VIPR chamber may also be performed by a human operator who interprets the flow front information provided by the image capture device and manually selects the location for deployment of the VIPR chamber. Similarly, although automated positioning of the VIPR chamber is ideal, a human operator could manually place the VIPR chamber in a desired location, either in response to a computer-identified location for deployment, or based upon visually inspection.

Figures 5A, 5B:
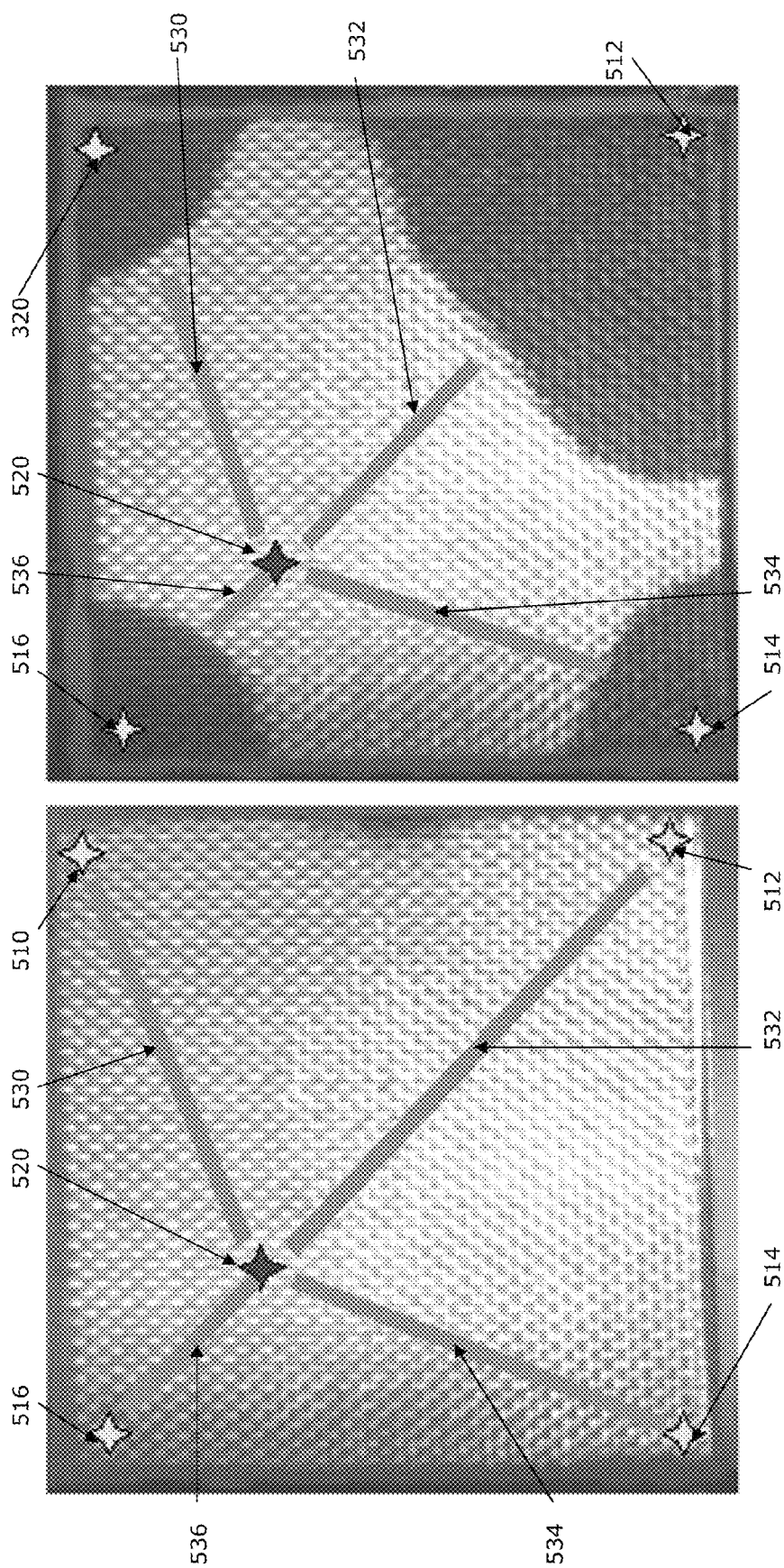
FIG. 5A is a photograph of an exemplary four corner port injection mold before the initiation of resin infusion.
FIG. 5B is a photograph of the four corner port injection mold of FIG. 5A at an intermediate time step during filling.

Stars 510, 512, 514 and 516 shown in FIGS. 5A and 5B indicate where the computer analysis locates the various gates. Star 520 indicates the vent. Lines 530, 532, 534 and 536 represent the distance between the vent and the resin flow front. FIG. 5A shows a photograph before the resin infusion is initiated. FIG. 5B shows a photograph at an intermediate time step during filling. The gate and vent locations are stored into the computer's memory and the pixels which lie in between each gate and the vent are used as resin flow sensors as shown in FIG. 5. During the infusion, photographs are taken at regular intervals and the program compares these new photographs with the first photograph of the unfilled mold. In this way the program is able to calculate the distance between the vent and the flow front in the direction of each gate. The program may also calculate the velocity of the flow front.

Figure 6:
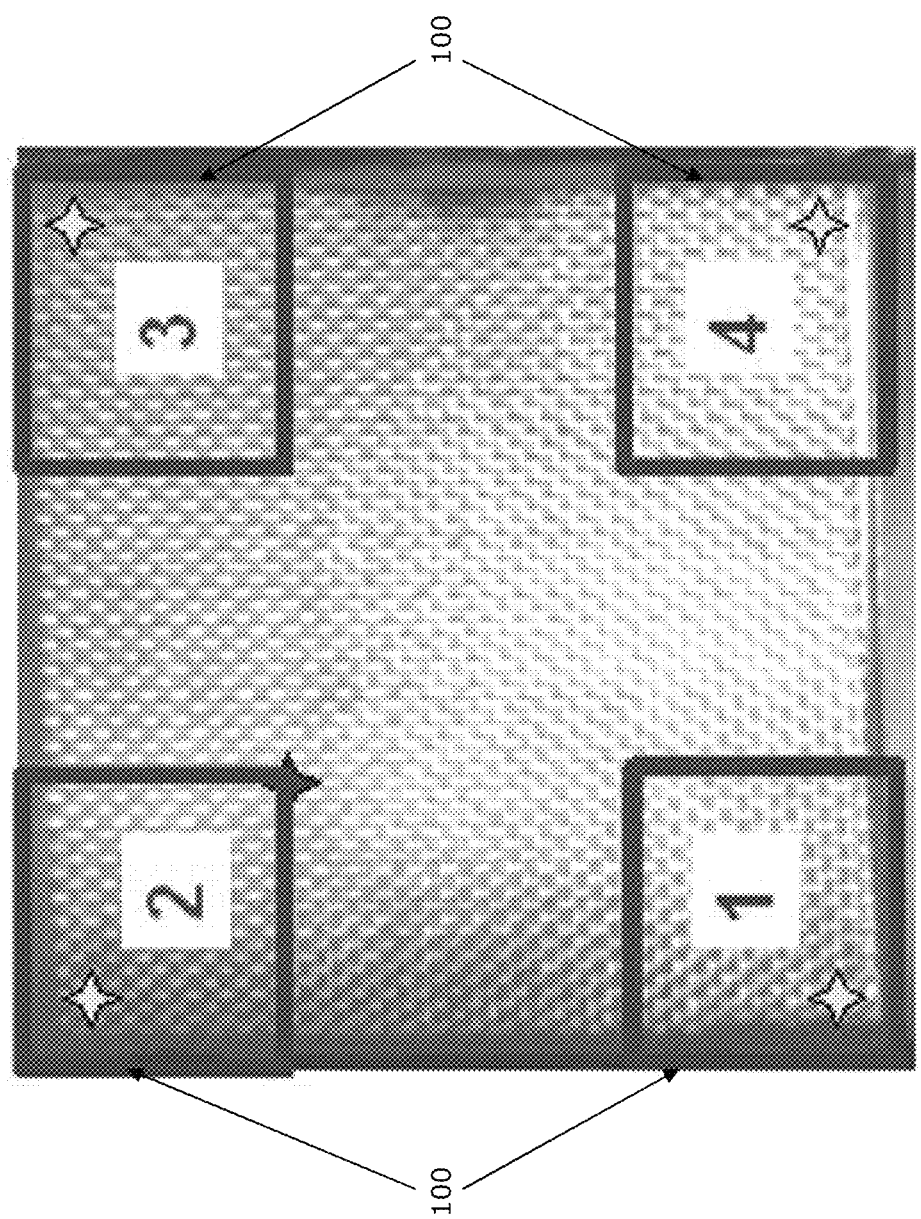
FIG. 6 is an illustration of four exemplary VIPR chamber positions on the four corner port injection mold of FIG. 5A showing labeled rectangles where the VIPR chamber may be sealed over the bag surface of the mold.

During step 440, the VIPR workstation is deployed to a gate to perform a corrective control action based on at least distance information calculated in the previous step. FIG. 6 depicts the four positions 1, 2, 3 or 4 into which VIPR chamber 100 may be moved. As described above, in the closed loop controller design, the VIPR chamber 100 is moved over the gate which was found to have the largest distance between the vent and the resin flow front at that time step.

After the chamber moves into that position, the chamber is moved downward and pressed against the bag to form a tight seal and the regulated vacuum source is applied. This relaxes the fibers covering the gate allowing more flow through that gate. A control action may be executed at each time interval to equalize the distances by increasing flow at a selected resin flow injection port. The chamber is applied for a prescribed amount of time, after which the chamber is de-pressurized, lifted, and moved back to its home position. The program then waits for another prescribed amount of time before repeating the process. The infusion is terminated once one of the distances is calculated to be zero, signaling that the resin has reached the vent.

Figure 7:
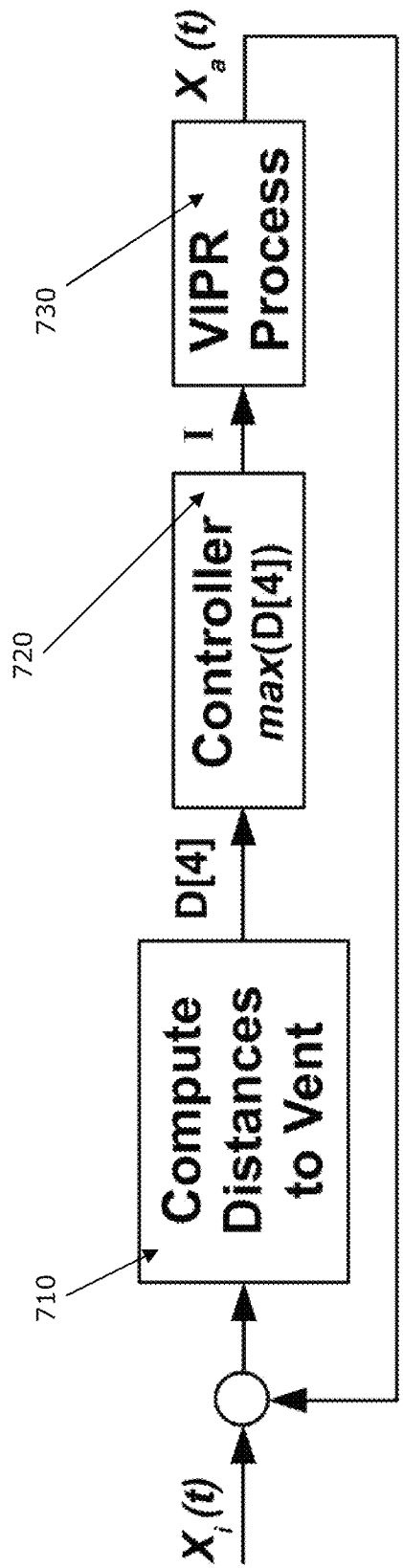
FIG. 7 is an exemplary control loop diagram for an exemplary process for infusion into a square mold with an off-centered vent using a VIPR process with closed loop control.

FIG. 7 represents a simple closed loop controller with flow front feedback for the control methodology. The control starts with an initial known representation of the flow front, $X_i(t)$. This signal is processed by a flow analyzer at step 710 to determine the distance between the vent location and the flow front along the four pathways between the vent and each injection gate. The flow analyzer outputs an array, D[4], with the four distances to the controller at step 720. The controller finds the index, I, of the largest value in D[4]. The value of I corresponds to the gate number to which the chamber is then sent. At step 730, the actual flow front, $X_a(t)$, is modified, and the controller returns to the beginning of the control loop.

Adaptive Control

To address more complex mold geometries, flow disturbances, and resin injection methods, a more sophisticated model-based adaptive flow control methodology may be used. A software tool that simulates the mold filling stage of resin transfer molding (RTM) may be used to numerically simulate future flow front patterns to test various possible control actions. A suitable such software tool is Liquid Injection Molding Simulation (LIMS) software, developed by the University of Delaware, which models flow through porous media using a Finite Element/Control Volume Method, but the invention is not limited to any particular software tool or simulation methodology. This simulation provides information on which control action may be initiated to achieve the control objective of full preform infusion. Unlike the closed loop controller design previously discussed, the adaptive approach allows for real time evaluation of each possible VIPR chamber deployment location and its effect on future resin flow position, thus optimizing each controller action.

Figure 8:
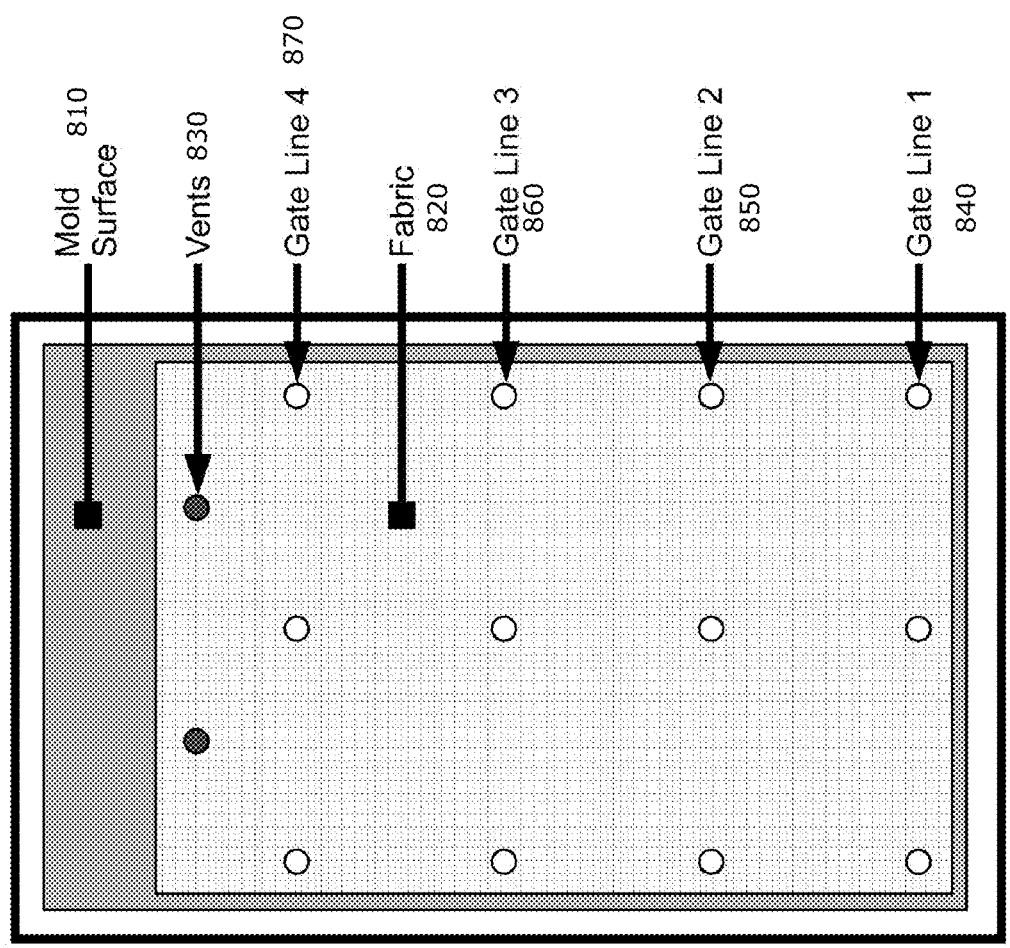
FIG. 8 is a schematic diagram of an exemplary mold used in conjunction with an exemplary adaptive model based flow control algorithm.

To demonstrate an exemplary adaptive, model-based controller, we refer to an exemplary sequentially injected mold shown in FIG. 8. The exemplary sequential injection method comprises first initiating resin flow from the gates aligned with "Gate Line 1" as shown in FIG. 8. Once resin has advanced far enough to cover all the gates aligned with "Gate Line 2" the gates in Gate Line 1 are closed and those in "Gate Line 2" are opened. This process is continued as the flow front progresses and resin covers gate lines closer to the vents.

Figure 9:
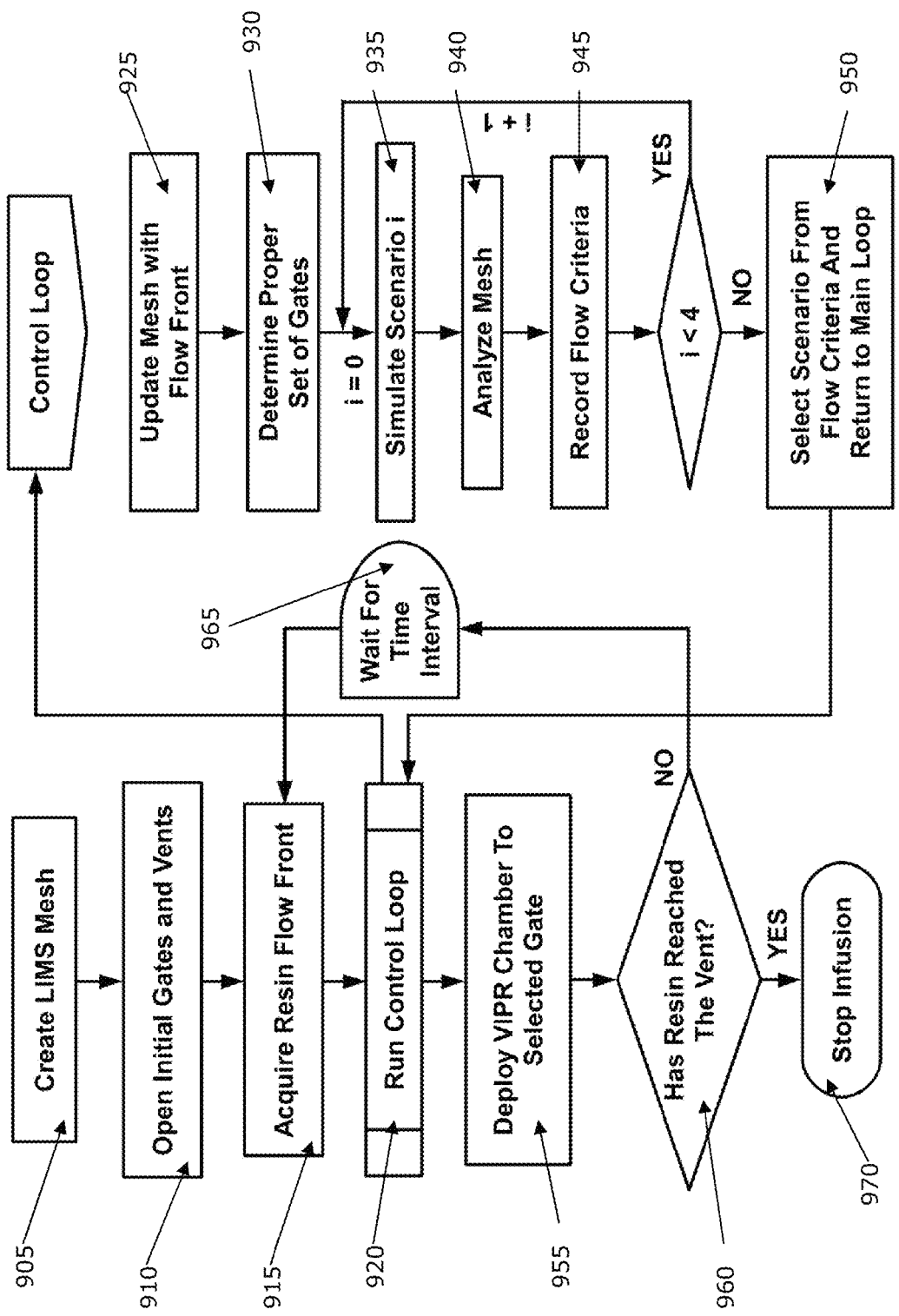
FIG. 9 is a flow chart depicting an exemplary model-based flow control methodology for use in a sequential injection mold.

An exemplary adaptive controller design algorithm is depicted in the flowchart shown in FIG. 9. The control objective is to fully infuse the preform by forcing the resin flow front to meet both vents 830 shown in FIG. 8 at the same time. The model for the controller begins at step 905 by first creating a finite element mesh that represents the fabric to be filled during the process. Since the gate and vent locations are known, the mesh incorporates these features into groups called regions. At step 910, the process opens the gates associated with "Gate Line 1" and vents 830. Then, at step 915, an image from a image capture device identifies the region occupied by resin at the moment the image is taken, and the flow front position is determined. Then the modeling process is initiated at step 920 for deciding which control action is most appropriate.

First, at step 925, the mesh is updated by assigning filled status to the nodes which are covered by the resin from the digital picture. Depending on the location of the resin flow front, the line of gates through which the resin will be injected is identified at step 930. Then, four simulations are processed within the LIMS environment at steps 935, 940 and 945, all starting from the same resin flow pattern provided from the digital image assuming continued resin injection from the gates identified in step 930. One simulation is conducted to predict the future flow patterns if no control action involving the VIPR chamber is invoked. The remaining three scenarios simulate what the future resin flow pattern will be if the VIPR chamber were to be sent to the location of one of the three inline injection gates of the currently open gate line. At the end of each simulation, the domain is analyzed to determine some established criteria such as the distance between the farthest and closest point of the flow front profile from the injection gates. After all four simulations are completed, the best case scenario (for example, the scenario that gives a flow front closest to a straight line perpendicular to the flow direction) is selected from the information computed at step 950. The selected scenario is then implemented at step 955 by the control software to deploy (or not deploy, if that is the best case) the VIPR chamber. At step 960, the control software evaluates if the resin has reached the vent. If the resin has not reached the vent, the control algorithm is then designed to wait for a pre-selected time interval at step 965 before reassessing the flow front by taking another digital photograph. This process continues until resin reaches one of the two vents 830 shown in FIG. 8 at which point the infusion is stopped at step 970.

This flow control algorithm can adapt to any flow conditions since the mesh is updated with the most current information about the flow front each time a control action is being considered. Note the LIMS software can run the four scenarios mentioned in about 3 seconds on a 1266 MHz computer processor with a mesh size of approximately 1000 nodes, whereas the time between control actions is typically in the range of 1-3 minutes. Permeability of the preform when under the influence of the VIPR chamber is one input needed for LIMS simulation. Such information may be experimentally derived for a given mold architecture.

Figure 10:
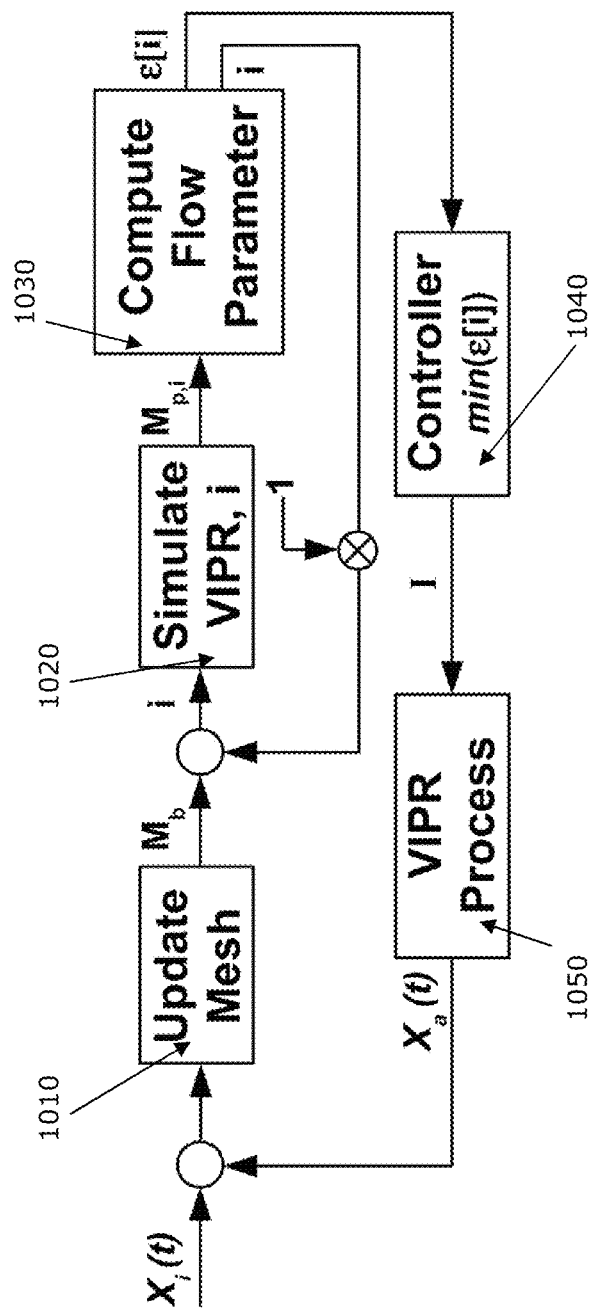
FIG. 10 is an exemplary control loop diagram for sequential injection in a mold using an exemplary model-based control algorithm.

This exemplary flow control method is further illustrated in FIG. 10. FIG. 10 shows another type of closed loop control with flow front prediction and feedback. First the initial flow front, $X_i(t)$, is acquired from an image of the mold. At step 1010, this information is then used to produce a baseline numerical mesh, $M_b$, with updated resin flow front data. Step 1020 is repeated so that the four simulation scenarios are performed on $M_b$, each simulation producing a result, $M_{p,i}$, which predicts the flow front location for each scenario. After each simulation $M_{p,i}$ is subject to a flow front analysis at step 1030. Step 1030 computes a parameter, $\epsilon$, which represents how far the predicted flow front is from the target flow front (i.e. a straight line perpendicular to the length of the mold). An array is formed from the $\epsilon$ of each simulation, which is sent to the controller. At step 1040, the controller outputs the index, I, of the smallest value in $\epsilon[i]$ which represents the predicted flow front closest to an ideal flow front. Then I is sent to the VIPR process, where the value of I represents which control action should be taken, if any at all. At step 1050, the VIPR process then modifies the actual flow front in the mold, $X_a(t)$, which is sent back to the beginning of the control algorithm.

EXAMPLE 1

Closed Loop Control

The following example illustrates use of the above-described VIPR chamber and the above described workstation to demonstrate how online control may be used to drastically reduce the unfilled area. The VIPR process is used to manipulate resin flow patterns to assure that the vent location is always in the vicinity of the last region in the mold to be filled, independent of flow disturbances.

Figure 11:
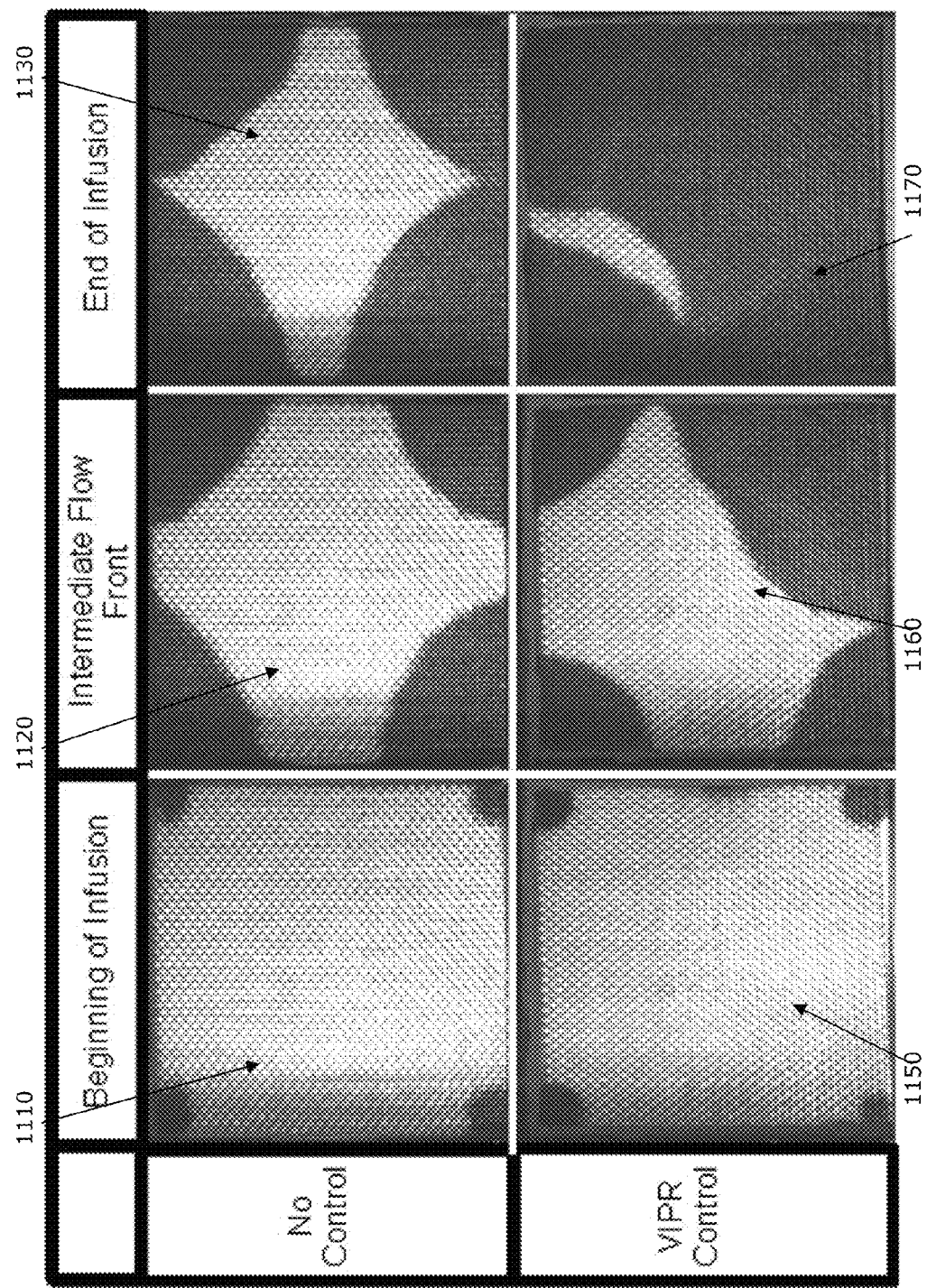
FIG. 11 is a series of photographs taken during infusion of a four corner injection mold. The top row shows photographs taken at selected times during a VARTM process without control and the bottom row shows photographs taken at selected times using an exemplary control scheme described herein.

Validation experiments were conducted to show the potential for online flow control using the VIPR process. For this set of experiments, six layers of 24 oz woven E-Glass were used. For the VIPR control experiment, the regulated vacuum source was held at a constant level of 17 kPa. The LABVIEW® program was set to wait 40 seconds between the end and the beginning of any two control actions. During the corrective control action the VIPR chamber was pressed against the mold surface for a duration of 15 seconds. FIG. 11 shows photographs comparing a baseline test with no control versus infusion using VIPR control on a four corner injection mold with an off center vent, such as that depicted in FIG. 3. Light areas in FIG. 11 correspond to dry preform and the dark regions correspond to areas saturated with resin. Photographs 1110 and 1150 show the infusion process without control and with control, respectively, immediately after beginning the infusion process from the four corner gates.

Photographs 1120 and 1160 show an intermediate time during the infusion process, with and without control, respectively. Photograph 1120 illustrates a generally symmetric flow pattern about the center of the mold (but non-symmetrical relative to the mold vent), with slight variations due to any number of factors that contribute to variability in the material permeability. In photograph 1160, the VIPR chamber was automatically directed to be placed on Gate 4 to increase the resin flow in order to make the dry preform section of fabric more symmetric about the vent location.

Photographs 1130 and 1170 in the right column of FIG. 11 compares results of uncontrolled and controlled infusion, respectively, at the end of the infusion, when resin reaches the vent location. Photographs 1130 and 1170 were taken after nearly the same duration of time after infusion was initiated. The uncontrolled case, shown in photograph 1130, shows a symmetric flow front about the center of the mold (but non-symmetrical relative to the vent) with a significant amount dry preform remaining. The VIPR control case, shown in photograph 1170, was able to steer the flow so that flow from all gates arrive nearly at the same time at the vent by successfully encouraging additional flow from primarily Gate 4 and secondarily from Gate 3 automatically, based on the quantitative distance information provided by the camera.

The photographs in the right column of FIG. 11 were analyzed to quantify the amount of dry preform present at the time when resin first reached the vent location. In the uncontrolled case there was 32.9% dry preform remaining at the end of the infusion. This was significantly reduced in the VIPR control case, in which only 5.3% of the mold remained unfilled. In most resin infusion applications, the resin is typically permitted to bleed from the vent for a short duration to allow the remaining 5.3% to fill. It should be noted that this would not be possible in the uncontrolled case, because the unfilled region was very large. Instead, the infusion process would have required more time to get to an acceptable end point.

EXAMPLE 2

Adaptive Control

To quantify the performance of an exemplary adaptive control methodology, the area of the unfilled region once the flow front reaches either of the two vents shown in FIG. 8 was measured. This parameter not only reflects the ability of the control system to avoid the creation of macro-voids in the mold but also the amount of resin that would be wasted waiting for the remainder of the preform to become saturated via resin bleeding. In addition, the amount of time it took to fill an entire mold using the control strategy as compared to the baseline injection scheme with no control was also quantified and compared.

First, to test the ability of the adaptive control system to decrease total infusion time, infusions were conducted with and without control, without racetracking. All other experimental conditions were held constant such as viscosity and vacuum pressure, the only difference being the use of the VIPR chamber. The resin injection gate lines were updated sequentially in both the control and uncontrolled examples. The result of this pair of experiments showed that using the VIPR control gantry system and the adaptive-model-based flow control was able to reduce the filling time of the infusion by an average of 35.6%.

Figure 12:
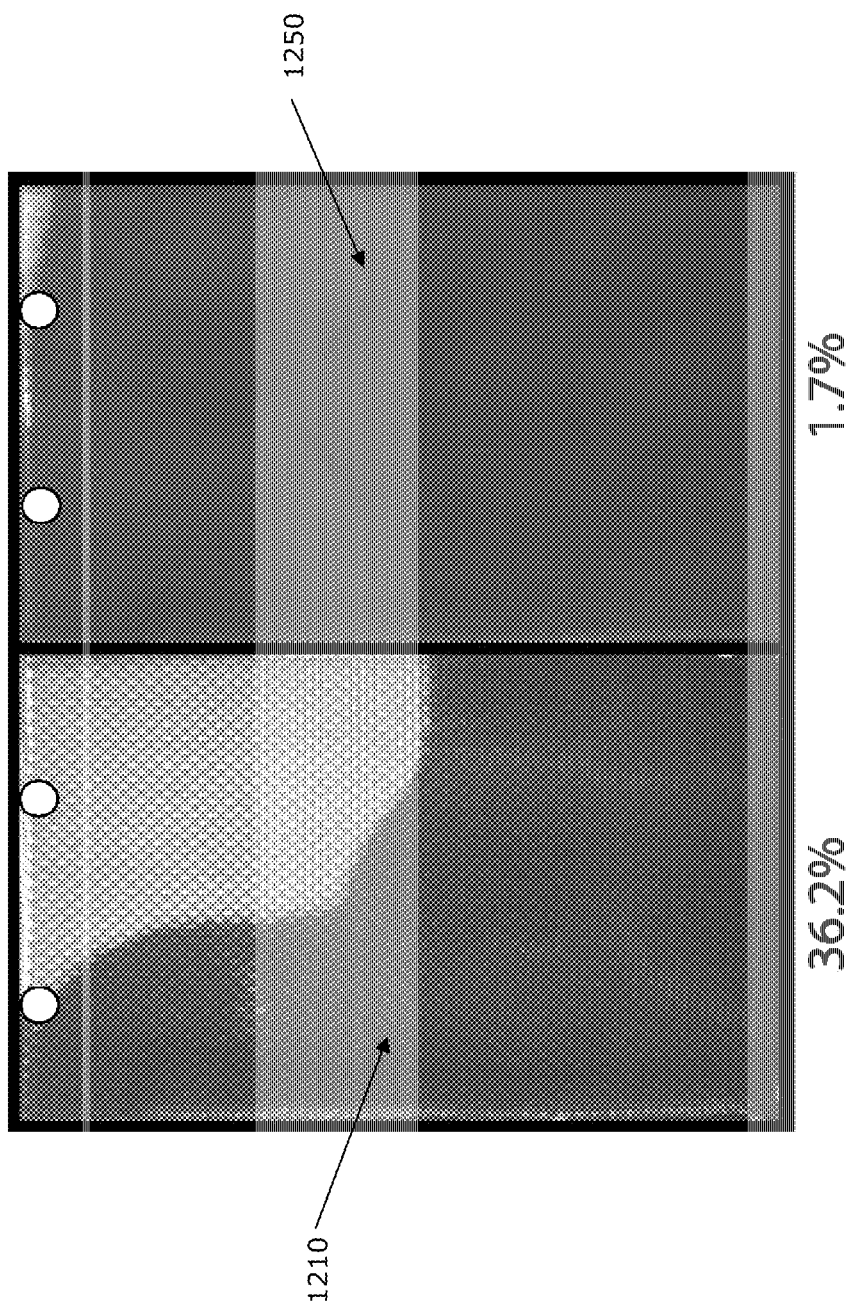
FIG. 12 is a pair of photographs of the final resin saturation for a mold with racetracking induced on one side of the mold, with and without use of an exemplary adaptive control scheme described herein.

To effectively evaluate the adaptive-model-based control algorithm, racetracking—normally a random phenomenon—was intentionally introduced by placing distribution media (DM) in the middle of the laminate along one edge of the mold. The results of the uncontrolled versus adaptive-model-based control in the presence of a racetrack along one side of the mold are shown in FIG. 12. Photograph 1210 shows the uncontrolled resin infusion results. Photograph 1250 shows the adaptive control resin infusions results. In each step of the controlled case, the model based algorithm attempts to reduce unevenness in the flow front, the ideal being a straight flow front that reaches the vents. As seen in FIG. 12, the adaptive controller reduced the amount of unsaturated preform to 1.7% from 36.2% without adaptive control.

Figure 13:
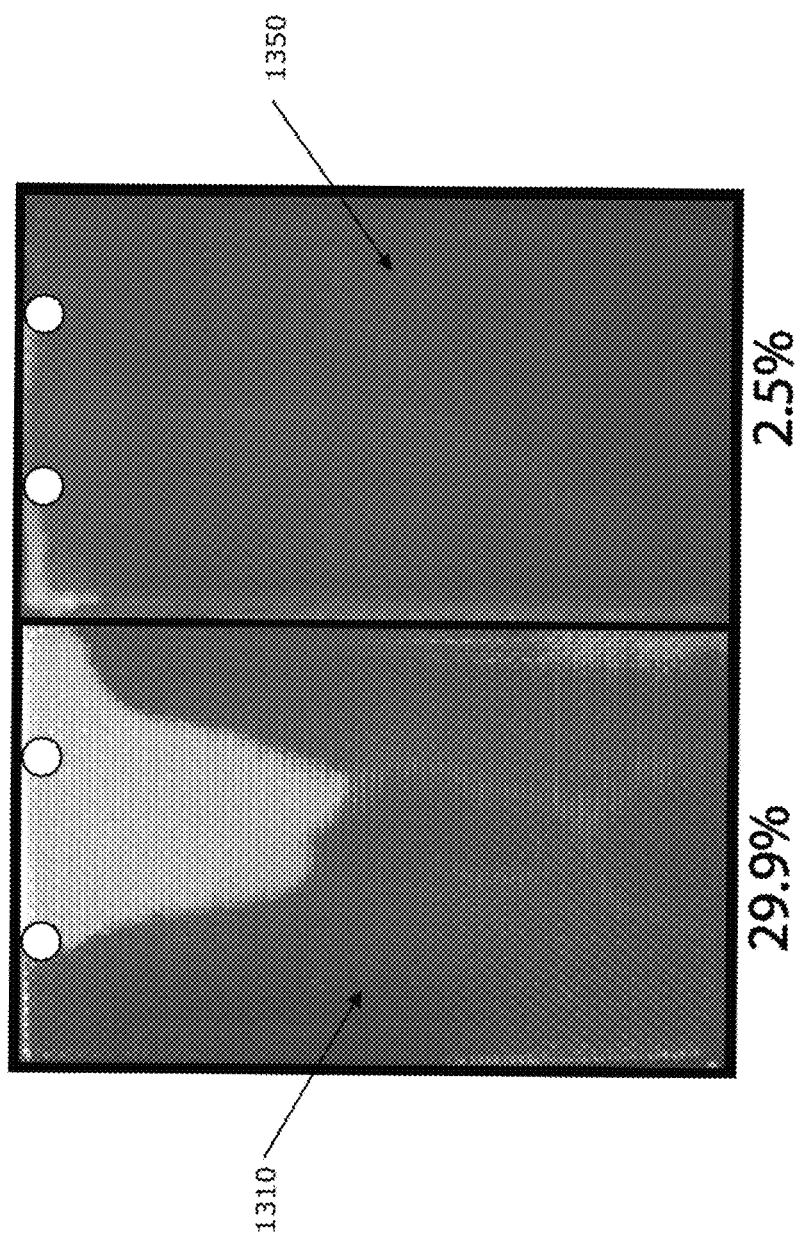
FIG. 13 is a pair of photographs of the final resin saturation for a mold with racetracking induced on both sides of the mold, with and without use of an exemplary adaptive control scheme described herein.

The performance and robustness of the adaptive controller was further investigated by introducing racetracking on both sides of the mold. Photograph 1310 in FIG. 13 shows the uncontrolled resin infusion results. Photograph 1350 shows the adaptive control resin infusion results. Again, the model-based control was able to significantly achieve the intended result of making the flow front as straight across the width as possible at each control step.

It should be understood that the exemplary embodiments described herein are simplified examples of molds with a limited number of injection ports, vents, VIPR chambers, and potential locations for the VIPR chambers. The same methodologies and systems described herein may be applied for molds with many more ports, vents, and multiple VIPR chambers to assist in improving permeability to resin flow in identified locations. Similarly, although a VIPR chamber is discussed herein as the primary embodiment for providing preform relaxation to increase resin permeability in a selected area of the mold, other methods for increasing permeability may be used in conjunction with the control systems and methods described herein. Thus, any method for identifying flow fronts, determining where increased permeability is desired, and increasing the permeability in the identified region is within the spirit of this invention.

Finally, it is understood by one of skill in the art, that embodiments of the present invention relate not just to methods for carrying out the aforementioned steps, such as with a computer or other processor, but also to systems for executing the methods, including such apparatus, workstations or processors. For example, the method may be performed by a processor programmed with instructions corresponding to the method steps described herein. Embodiments of the invention also include computer readable media including program instructions, which when executed by a processor, cause the processor to perform the method steps, as well as processors so programmed.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A method for vacuum infusing resin into a fabric preform within a mold, the mold comprising a tool surface, a plurality of resin injection ports, at least one vent, and a flexible film covering the preform and sealed to the tool surface, the method comprising the steps of:
   (a) injecting resin through the plurality of resin injection ports;
   (b) detecting a plurality of resin flow fronts emanating from the resin injection ports;
   (c) predicting an effect of sealing a vacuum induced preform relaxation (VIPR) chamber over the flexible film based on the detected plurality of resin flow fronts, the predicting comprising simulating a future resin flow front based on a potential location for the VIPR chamber, and selecting a location for deploying the VIPR chamber based on the predicted effect; and (d) deploying the VIPR chamber in a sealed relationship with the flexible film in the selected location and introducing vacuum into the VIPR chamber.

2. The method of claim 1, comprising periodically repeating steps (b)-(d).

3. The method of claim 2, comprising moving the VIPR chamber from a first location corresponding to a first flow front dictated by one performance of step (c) to a second location corresponding to a second flow front dictated by a later performance of step (c).

4. The method of claim 3, wherein each of the first location and the second location comprises a location in which the VIPR chamber is juxtaposed over one of the injection ports.

5. The method of claim 1, wherein the step of detecting the plurality of resin flow fronts comprises creating an image of the plurality of flow fronts relative to the injection ports and the at least one vent using an image detector connected to a computer processor.

6. A method of vacuum infusing resin into a fabric preform within a mold, the mold comprising a tool surface, a plurality of resin injection ports, at least one vent, and a flexible film covering the preform and sealed to the tool surface, the method comprising the steps of:
 (a) injecting resin through the plurality of resin injection ports;
 (b) detecting a plurality of resin flow fronts emanating from the resin injection ports;
 (c) using a processor programmed with a predictive model to predict an effect of sealing a vacuum induced preform relaxation (VIPR) chamber over the flexible film in each of a plurality of locations based on the detected plurality of resin flow fronts, the predicting comprising simulating a future resin flow front based on a potential location for the VIPR chamber, and selecting a location for deploying the VIPR chamber from the plurality of locations based on the predicted effect; and
 (d) deploying the VIPR chamber in the selected location and introducing a vacuum into the VIPR chamber.

7. The method of claim 6, comprising periodically repeating steps (b)-(d).

8. The method of claim 7, comprising moving the VIPR chamber from a first location dictated by one performance of step (d) to a second location dictated by a later performance of step (c).

9. The method of claim 8, wherein each of the first location and the second location comprises a location in which the VIPR chamber is juxtaposed over one of the injection ports.

10. The method of claim 1, wherein the step of detecting the plurality of resin flow fronts comprises creating an image of the plurality of flow fronts relative to the injection ports and the at least one vent using an image detector connected to a computer processor.

11. A method for vacuum infusing resin into a preform within a mold, the mold comprising a tool surface, a plurality of resin injection ports, at least one vent, and a flexible film covering the preform and sealed to the tool surface, the method comprising the steps of:
 (a) injecting resin through the plurality of resin injection ports;
 (b) detecting a plurality of resin flow fronts emanating from the resin injection ports;
 (c) using a processor programmed with a predictive model to predict an effect of increasing permeability in each of a plurality of locations based on the detected plurality of resin flow fronts, the predicting comprising simulating a future resin flow front based on a potential location for increasing resin permeability, and selecting a region based on the predicted effect;
 (d) locally increasing resin permeability in the identified region.

12. The method of claim 11, wherein the detecting step comprises using an image capture device and the step of locally increasing resin permeability comprises moving a vacuum induced preform relaxation (VIPR) chamber to the identified region, sealing the VIPR chamber to the flexible film in the identified region, and introducing vacuum into the VIPR chamber.

13. The method of claim 11, wherein the prediction comprises determining a distance between each resin flow front and the at least one vent; identifying the resin flow front that is furthest from the vent, and selecting the identified region to include a region overlying the resin injection port corresponding to the resin flow front furthest from the vent.

* * * * *